United States Patent [19]

Wilson et al.

[11] Patent Number: 4,592,442
[45] Date of Patent: Jun. 3, 1986

[54] CONTROL SYSTEM FOR A VEHICLE WITH TWO SPEED REAR AXLE AND SINGLE SPEED FRONT AXLE DRIVE

[75] Inventors: B. Lee Wilson; Ernest J. Fasick; James H. King; Noel E. Leitzman, all of Fort Wayne, Ind.

[73] Assignee: International Harvester Company, Chicago, Ill.

[21] Appl. No.: 676,050

[22] Filed: Nov. 29, 1984

[51] Int. Cl.⁴ ............................................ B60K 17/34
[52] U.S. Cl. ..................................................... 180/247
[58] Field of Search ............... 180/247, 242, 243, 233, 180/244, 248, 245, 249

[56] References Cited

U.S. PATENT DOCUMENTS

| | | | |
|---|---|---|---|
| 4,290,318 | 9/1981 | Ookubo et al. | 180/247 |
| 4,407,387 | 10/1983 | Lindbert | 180/247 |

FOREIGN PATENT DOCUMENTS

| | | | |
|---|---|---|---|
| 0036729 | 3/1983 | Japan | 180/247 |
| 0085725 | 5/1983 | Japan | 180/247 |

*Primary Examiner*—John J. Love
*Assistant Examiner*—Mark C. Dukes
*Attorney, Agent, or Firm*—Dennis K. Sullivan; F. David Au Buchon

[57] ABSTRACT

A control system for a two-wheel/four-wheel drive vehicle having a rear axle which can be operated in a high speed mode or a low speed mode and a front axle which can be drivingly coupled to the engine power train to place or maintain the rear axle in the low speed mode when the front axle is sensed to be engaged. The control system includes several switches. A first switch is provided for sensing when the front axle is drivingly coupled to the power train. A second switch is associated with a speed selection control system of the vehicle for causing the power train to be driven in a low speed mode or a high speed mode. A third switch is coupled to the first switch and is responsive to sensing of the front axle being drivingly coupled to the power train for preventing the second switch from causing the rear axle to be driven in the high speed mode and for forcing the rear axle to be driven in the low speed mode so long as the front axle is drivingly coupled to the power train. Preferably the system also includes a fourth switch for sensing when the mode of operation of the rear axle is being changed from a low speed mode to a high speed mode and a mechanism responsive to the sensing by the fourth switch for preventing or locking out the front axle from being drivingly coupled to the power train.

10 Claims, 3 Drawing Figures

CONTROL SYSTEM FOR A VEHICLE WITH TWO SPEED REAR AXLE AND SINGLE SPEED FRONT AXLE DRIVE

BACKGROUND OF THE INVENTION

1. Field of the Invention

The present invention relates to a control system for automatically preventing the shifting of the drive of a two speed rear axle in a vehicle from a low speed mode of operation into a high speed mode of operation when a front axle is drivingly coupled to the engine power train for the vehicle.

2. Description of the Prior Art

Present day 4×4 vehicles, namely commercial vehicles, such as utility company work trucks, snow plows, trucks, etc. having single speed front and rear axles are geared to produce axle ratios having a top geared speed of approximately 52 miles per hour (mph) particularly when powered by low speed engines such as diesels. This 52 mph speed is below the present norm of 55 mph highway speed. Further, the single speed axles, while providing the ability of attaining 52 mph highway speeds, do not provide any gradeability to the drive axles for off-road, low gear performance.

Accordingly, it is desirable to provide a vehicle which can reach and maintain an acceptable driving speed during highway travel and yet be capable of being downshifted to a low gear 4×4 operation for off-road use.

Further, it is desirable to provide a control system for preventing the front axle from being powered while enabling the vehicle to be operable in a high speed mode at highway speeds without the front axle being powered with the engine power train to protect the transmission and front end drive train from harm caused by high speed driving and axle speed mismatch if the front axle was engaged.

As will be described in greater detail hereinafter, the control system of the present invention includes an electrical control circuit which facilitates an acceptable gear-down gradeability for a vehicle for off-road low speed operation thereof and yet permits high speed operation at acceptable road speeds while preventing high speed operation when the front axle is drivingly coupled to the engine power train.

SUMMARY OF THE INVENTION

According to the invention there is provided a control system for a two-wheel/four-wheel drive vehicle having a rear axle which can be operated in a high speed mode or a low speed mode and a front axle which can be drivingly coupled to the engine power train only during rear axle low speed mode operation, said control system including: first means for sensing when the front axle is drivingly coupled to the power train; second means associated with a speed selection control system of the vehicle for causing said rear axle to be driven in a low speed mode or a high speed mode; and third means coupled to said first means and responsive to sensing of the front axle being drivingly coupled to the power train for preventing said second means from causing said rear axle to be driven in said high speed mode and for forcing said rear axle to be driven in said low speed mode so long as the front axle is drivingly coupled to the power train.

Preferably the system also includes fourth means for sensing when the mode of operation of the rear axle is being changed from a low speed mode to a high speed mode and fifth means responsive to the sensing by said fourth means for preventing or locking out the front axle from being drivingly coupled to the power train.

DESCRIPTION OF THE PREFERRED EMBODIMENTS

Figure 1:
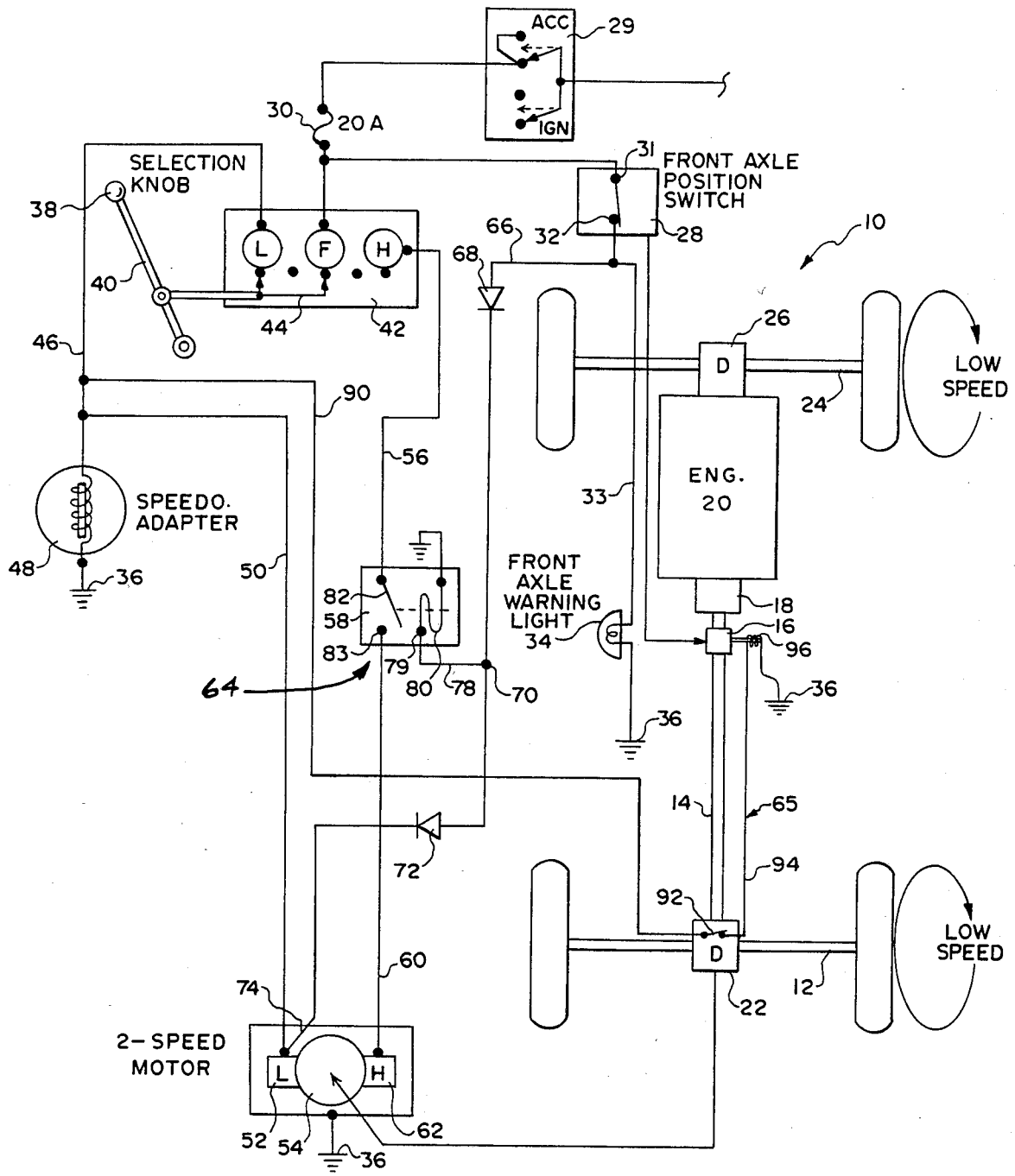
FIG. 1 is a block schematic circuit diagram of an electrical control system of the present invention for a two-wheel/four-wheel drive system for an on-road/off-road vehicle and shows the vehicle in a low speed, four-wheel drive, off-road mode of operation.

Referring now to the drawings in greater detail, there is illustrated in FIG. 1 a partially schematic circuit diagram and partially mechanical drawing of a 4×4 vehicle, e.g., a truck, which is generally identified by the reference numeral 10 and which has a two-speed rear axle 12 adapted to be drivingly engaged by a power train 14 coupled through a transfer case 16 and a vehicle transmission 18 to an engine 20 of the vehicle 10.

A two-speed differential 22 is situated between the power train 14 and the axle 12 and is adapted to be placed in a low speed mode of operation or a high speed mode of operation as will be described in greater detail hereinafter.

The two-speed rear axle 12 enables the vehicle 10 to be driven in a high speed mode to and from a job site and yet allows for high gear reductions for off-road operation of the vehicle 10.

Furthermore, the vehicle 10 has a front axle 24 that is adapted to be drivingly engaged or coupled to the power train (not shown) for low speed, four-wheel drive, off-road operation of the vehicle 10. For this purpose, the front axle 24 has a differential 26 which is adapted to be drivingly coupled or engaged with the power train (not shown).

The vehicle 10 further includes a front axle position switch 28 which is typically mounted in the transfer case 16 and senses when the axle 24 is drivingly coupled or engaged with the power train (not shown). When the front axle 24 is engaged, the switch 28 is closed and completes a circuit from a source of electric power, such as a battery or alternator, through an ignition switch 29 and a fuse 30, switch blade 31 and switch contact 32 of switch 28 when it is closed, and a conductor 33 through a front axle warning light 34 mounted on the vehicle dashboard, to ground 36.

Although not shown, it will be understood that there is a shift lever arm for engaging and disengaging the axle 24 and power train with the transfer case 16. The switch 28 can be associated with that lever arm or with the transfer case 16 as described above.

Further it will be understood that the transmission 18 has coupled thereto an automatic transmission lever arm or a gear shift lever arm and a clutch (not shown).

Then, for the purposes of placing the rear axle 12 in a low speed mode of operation or a high speed mode of operation, the vehicle 10 has a selection knob 38 at the end of a selection lever arm (or shaft) 40 which is connected to a single pole, double throw switch assembly 42 having a central terminal "F" coupled to one side of the fuse 30 and a movable wiper arm or blade 44 for establishing electrical contact between the terminal "F" and a low speed terminal "L" or the terminal "F" and a high speed terminal "H" of the switch assembly 42.

In FIG. 1, the selection knob 38 is shown in a "LOW" position where the terminal "F" completes a circuit from the fuse 30 to the "L" terminal and from there via a conductor 46 to a speedometer adapter 48 which places the speedometer in a proper gear ratio relationship with a low gear reduction setting of the differential 22 which is driving the axle 12 in a low speed mode of operation.

Further, the conductor 46 is coupled via conductor 50 to a low speed terminal 52 of a two-speed electric motor 54. The two speed electric motor 54 is mounted on the rear axle differential 22. The motor 54 is operable to wind a shift spring (not shown) and turn off. The spring moves a sliding gear in the differential 22, when the torsional forces allow such operation to take place (the clutch is disengaged or torque reversal occurs) to complete the shift. At the same time, and as stated above, the speedometer adapter 48 is also shifted to adjust the calibration of the speedometer for the different axle ratio established by the low gear or low speed mode of operation of the rear axle 12.

Figure 2:
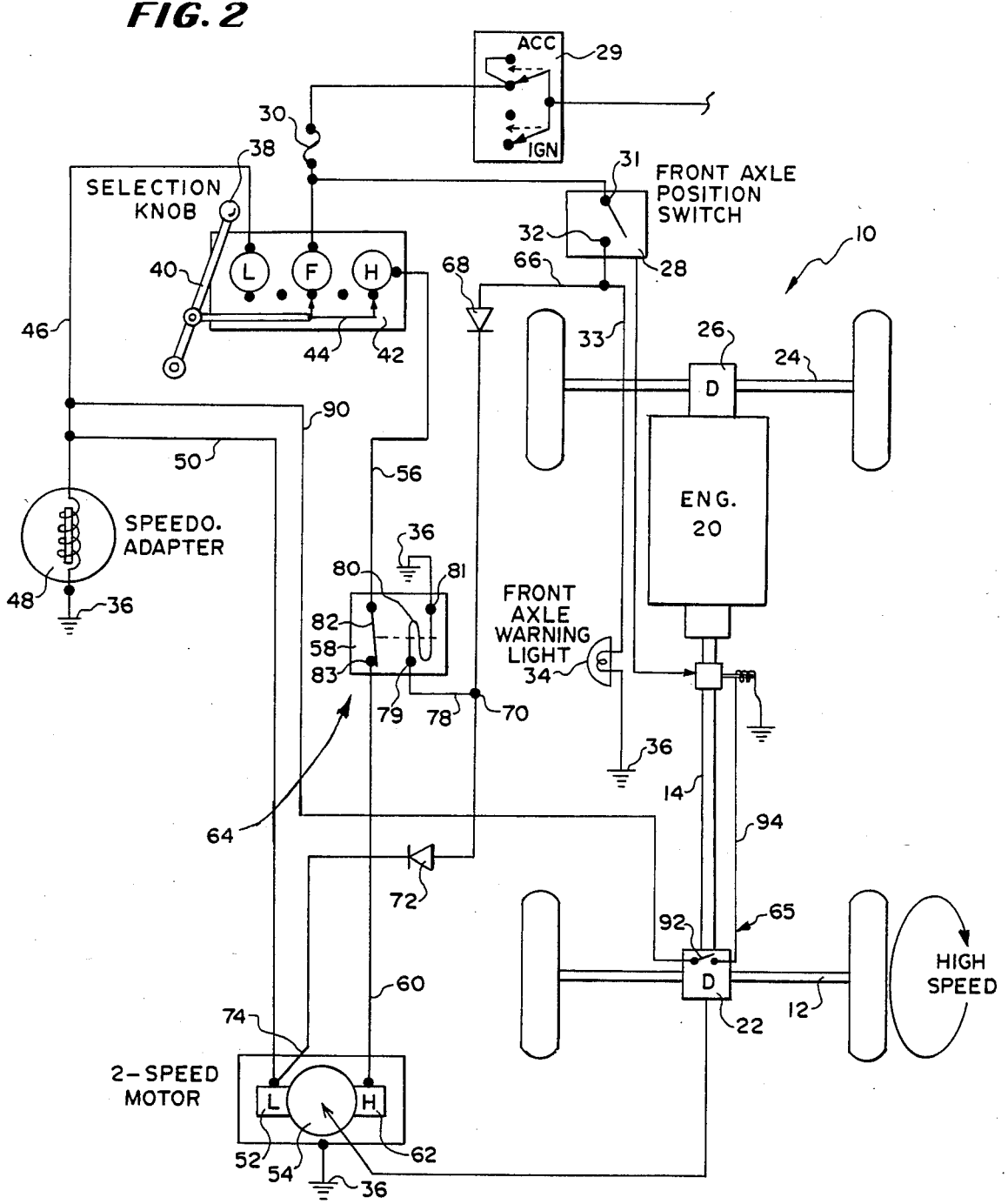
FIG. 2 is a block schematic circuit diagram similar to the diagram shown in FIG. 1 but shows the vehicle in a high speed, two-wheel drive on-road mode of operation.

When it is desired to place the rear axle 12 in a high speed mode of operation, the selector knob 38 is moved to connect terminal "F" with terminal "H" of switch assembly 42 as shown in FIG. 2 so that a circuit is completed from the fuse 30 through conductor 56 relay/switch 58 and conductor 60 to a high speed terminal 62 of the two-speed motor 54 as will be described in greater detail below in connection with the description of FIG. 2.

In accordance with the teachings of the present invention, a control circuit generally designated 64 is coupled between the conductors 56 and 60 and the low and high terminals 52 and 62 of the motor 54 for ensuring that when the selection knob 38 is moved from the low speed position to the high speed position, the circuit through conductors 56 and 60 will be open circuited by the operation of relay/switch 58 if the front axle position switch 28 is closed and the front axle 24 is engaged.

Preferably, the control circuit 64 also includes a circuit 65 which ensures that the front axle 24 is locked out of engagement with, or prevented from engaging, the power train (not shown) if the differential 22 is not in the low speed mode.

The control circuit 64 includes a latching circuit 66 coupled to the conductor 33. The circuit 66 is energized when the front axle position switch 28 is closed and includes a first diode 68, a junction 70, a second diode 72 and finally a connection 74 to the low speed terminal 52 of the motor 54. The circuit 66 with diodes 68 and 72 therein ensures that when the front axle position switch 28 is closed, electric power is supplied to the low speed terminal 52 and will continue to be supplied to the low speed terminal 52 even if the selection knob 38 is inadvertently moved to the high speed position thereof shown in FIG. 2.

At the same time, the junction 70 is coupled through a conductor 78 to one side 79 of a latching relay member 80, the other side 81 of which is connected to ground 36. When this latching relay member 80 is energized, it opens and maintains open relay/switch 58, i.e., it moves blade 82 thereof away from switch contact 83 thereof, to establish an open circuit between conductors 56 and 60. This results in an open circuit of the electrical circuit comprising conductors 56 and 60 from the high speed terminal "H" of the selector switch 42 and the high speed terminal 62 of the motor 54.

Thus it will be seen that when the selector knob 38 is in the low speed position shown in FIG. 1 and the front axle 24 is engaged to cause closing of the front axle position switch 28, the circuit from the high speed terminal "H" on the selection switch 42 to the high speed terminal 62 on the motor 54 is open circuited and maintained open circuited while at the same time current is forced from the switch 28 via circuit 66, diodes 68 and 72 and connection 74 to the low speed terminal 52 of the two speed motor 54.

As a result, if the knob 38 is moved from the "L" connection shown in FIG. 1 to the "H" connection shown in FIG. 2, while the front axle 24 is engaged, nothing will happen and the vehicle 10 will stay in the low speed mode of operation.

Preferably, the circuit 64 also includes the circuit 65 for ensuring that the front axle cannot be engaged in vehicle 10 if the low speed shift sequence of rear axle 12 has not been completed (torque reversal or clutch engagement has not occurred). For this purpose, the circuit 65 includes a conductor 90 which is coupled between the conductor 46 and a sensing switch 92 in the rear differential 22. The other side of this switch 92 is coupled to a conductor 94 leading to a solenoid 96 that is connected on its other end to ground 36.

The solenoid 96 operates a lockout device or mechanism in the transfer case 16 which will lock out a drive connection from the transfer case 16 to the front axle 24 when the solenoid 96 is not energized.

As shown in FIG. 1, when the differential 22 is in low and the selection knob 38 is in the "L" connection, the solenoid 96 is energized to release the lockout mechanism in the transfer case 16.

Accordingly, if, during coasting of the vehicle 10, the rear differential 22 should move from the low speed mode of operation to the high speed mode of operation, the solenoid 96 is de-energized to lock out engagement of the front axle 24 to prevent damage to the power train (not shown) or the other parts of the vehicle 10. Again, if the front axle drive is engaged while the vehicle 10 is coasting (small torque maintained on the power train (not shown)) the rear axle downshift sequence is initiated but the sliding gear in the rear differential 22 does not shift. When this occurs, the switch 92 is opened to lock out front-wheel drive.

For this circuit arrangement to work, the two speed shift switch assembly 42 must be in the low position as shown in FIG. 1 to allow front-wheel drive operation. Then, the switch 92 or a similar switch associated with a clutch linkage or associated with a neutral position of an automatic transmission is closed thereby to operate the solenoid 96 or a similar solenoid associated with the shift linkage to create a torque break to allow shifting. Switch 92 can be actuated by a clutch release linkage or by an automatic transmission neutral safety switch to release the front axle drive control at the time of torque break/reversal to allow the front axle engagement sequence. Again, the switch 92 energizes the solenoid 96 which releases a lockout mechanism to allow shifting at the transfer case 16 to front-wheel drive.

In other words, if the rear axle differential 22 is in low gear the switch 92 is closed thereby energizing the solenoid to cause the lockout operating mechanism to be disengaged whereby the front axle 24 can be drivingly engaged or coupled to the power train (not shown). However, if when the selection switch assembly 42 is in the "L" connection as shown in FIG. 1 and the differential 22 should move toward the high speed gear position thereof, the switch 92 will be deenergized so as to operate the mechanism associated with the solenoid 96 to lock out engagement of the front axle 24 with the power train (not shown).

Referring now to FIG. 2, it will be apparent that when the knob 38 is moved to the high speed where wiper blade or contact 44 makes contact between the F terminal and the H terminal, a circuit is completed from the fuse 30 to conductor 56. Then, if the front axle position switch 28 is in the open position as shown in FIG. 2 the latching member 80 will be in a de-energized state where it causes closing of relay/switch 58 and latches switch 58 in a closed position to complete a circuit from the high speed terminal H in the selection switch 42 to the high speed terminal 62 of the two speed motor 54. At the same time the solenoid 96 is deenergized so that the lockout mechanism associated with transfer case 16 locks out and prevents driving engagement of the power train (not shown) with the axle 24.

Figure 3:
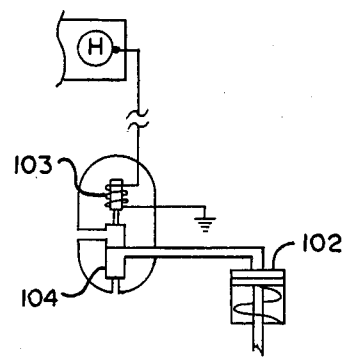
FIG. 3 is a schematic circuit diagram of an electric over air driven rear axle system which includes a two-speed axle solenoid and a two-speed shift cylinder.

Additionally, it will be understood that instead of a two speed motor 54 one could utilize a two speed shift cylinder 102 operated by a two speed axle solenoid 103 as shown in FIG. 3. This is commonly referred to as an electric-over-air system where an electric control system operates the solenoid 103 to operate a valve 104 which vents air from or supplies air to the two speed shift cylinder 102.

Also, it will be appreciated that the reverse current blocking diodes 68 and 70 ensure that if the front axle 24 is engaged, the two speed motor 64 or cylinder 120 is moved to a low speed position if it had been in the high speed position prior to front axle drive engagement. The circuit 64 maintains voltage on the low speed selection terminal 52 at the time the front axle 24 is engaged. The latching relay 80, is activated by the front axle warning light circuit 33 including warning light 34, when the front axle 24 is engaged.

From the foregoing description, it will be apparent that the control circuit 64 has a number of advantages some of which have been described above and others of which are inherent in the invention.

Also it will be apparent that modifications can be made to the control circuit 64 and the operating circuitry for the vehicle 10 (several modifications have been described above) without departing from the teachings of the invention. Accordingly, the scope of the invention is only to be limited as necessitated by the accompanying claims.

We claim:

1. A control system for a two-wheel/four-wheel drive vehicle having a rear axle which can be operated in a high speed mode or a low speed mode and a front axle which can be drivingly coupled to the engine power train only during rear axle low speed mode of operation, said control system including: first means for sensing when the front axle is drivingly coupled to the power train; second means operatively connected to a speed selection control system of the vehicle for causing said rear axle to be driven in a low speed mode or a high speed mode; and third means coupled to said first means and responsive to sensing of the front axle being drivingly coupled to the power train for preventing said second means from causing said rear axle to be driven in said high speed mode and for forcing said rear axle to be driven in said low speed mode so long as the front axle is drivingly coupled to the power train.

2. The control system of claim 1 including fourth means for sensing when the mode of operation of the rear axle is being changed from a low speed mode to a high speed mode and fifth means responsive to the sensing by said fourth means for preventing or locking out the front axle from being drivingly coupled to the power train.

3. The control system of claim 1 wherein said first sensing means include a front axle position switch coupled between a source of electric power and a front axle warning light, said front axle position switch being closed when the front axle is drivingly coupled to the power train.

4. The control system of claim 3 wherein said third means comprise a circuit connection from a junction between said front axle position switch and said warning light to a low position terminal of a low speed/high speed control device associated with the rear axle.

5. The device of claim 4 wherein said low speed/high speed control device is a two-speed electrical motor associated with a differential for the rear axle.

6. The control system of claim 4 wherein said low speed/high speed control device is a two-speed shift cylinder associated with a differential for the rear axle.

7. The control system of claim 2 wherein said second means comprise a power circuit from the selection control system to a high position terminal of a low speed/high speed control device associated with the rear axle and said third means include a relay in said power circuit and latching circuit means for operating said relay coupled between said front axle position switch and ground.

8. The control system of claim 7 wherein said latching circuit means comprise a latching member.

9. The control system of claim 7 and said latching circuit means including a diode coupled between said front axle position switch and said relay and a second diode coupled between said relay and a low position terminal of the two-speed control device.

10. The control system of claim 2 wherein said fourth means includes a sensing switch associated with a two-speed differential of the rear axle which is normally open when the rear axle is operated in a high-speed mode and is normally closed when the rear axle is operated in a low-speed mode, one side of said switch being coupled to a low position terminal of the speed selection control system which low position terminal is normally energized when the selection control system is in the low-speed position; and said fifth means comprises a lockout device associated with a transfer case coupled to the power train which device is operated by a solenoid and is in a front axle lockout position when the solenoid is not energized and is in a lockout release position permitting engagement of the front axle when the solenoid is energized, said circuit through said solenoid being energized when said selection control system is in a low-speed position and said differential is in low-speed so that the sensing switch is closed to complete a circuit through the solenoid and ground, and, upon the differential disengaging from low-speed and moving toward the high-speed position, the sensing switch is opened so as to de-energize said solenoid to cause said lockout device to lock out driving engagement of the front axle.

* * * * *